Figure 1:
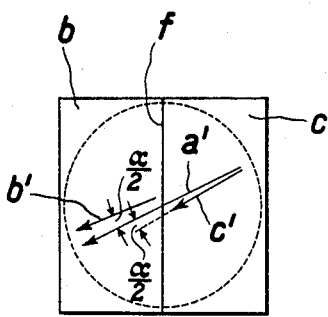

Nov. 28, 1933.                R. RICHTER                1,936,953
                          HALF SHADE POLARIZER
                         Filed Sept. 22, 1931

Inventor:

Robert Richter

UNITED STATES PATENT OFFICE 1,936,953

HALF SHADE POLARIZER

Robert Richter, Jena, Germany, assignor to the firm Carl Zeiss, Jena, Germany

Application September 22, 1931, Serial No. 564,448, and in Germany October 2, 1930

4 Claims. (Cl. 88—14)

I have filed an application in Germany, October 2, 1930.

The known half-shade polarizers consisting of elements that are cemented together so as to be integral with each other and whereof at least two are calcite prisms the crystal axes of which embrace in a plane approximately at right angles to the direction of the light a half-shade angle of at least 1°, have in addition to the surfaces to be passed by the light one or several other surfaces which, while lying in the range of the field of vision, are not used for the passage of light. There are also known half-shade polarizers consisting of several non-cemented elements one or several exterior surfaces of which play the same part. In some of these half-shade polarizers the said surfaces are visible in the field of vision as separating lines of finite breadth and, as a consequence, impair the adjusting accuracy of the half-shade device. In other cases, if care is taken that the detrimental surfaces are not struck by the light, these separating lines are exceedingly narrow, which, however, entails the necessity of using more calcite and consequently makes the adjustment of the optical elements more difficult.

The present invention refers to a half-shade polarizer of the said kind which avoids the aforesaid inconveniences. According to the invention this new half-shade polarizer offers a great advantage in so far as the light is passed by all its surfaces with the exception of its exterior ones which are generally outside the field of vision. Although it does not contain any of the said detrimental surfaces, a comparatively small number of optical elements are required for the construction of this half-shade polarizer.

The new half-shade polarizer is suitably made of three prisms and so constructed that one of the prisms is a triangular isosceles prism having cemented on its side surfaces one each of the two calcite prisms the crystal axes of which enclose the half-shade angle. If also the triangular isosceles prism is cut out of a crystal, its crystal axis is also provided in a plane at right angles to the direction of the light, in which case the position of the axis relative to the crystal axes of the two half-shade prisms is of no account in itself. However, with a view to attain a uniform illumination of the greatest possible strength, the said axis will be generally given such a position that it approximately bisects the half-shade angle enclosed by the two crystal axes of the half-shade prisms.

In order to economize calcite the triangular isosceles prism may be made of glass or any other similar substance. The preference will be given to substances having a refractive index which comes near the refractive index of the extraordinary ray in calcite.

Figure 3:
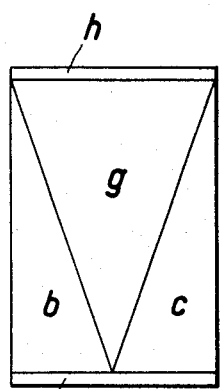
Figure 2:
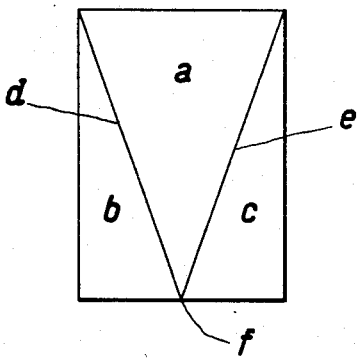

In the accompanying drawing, which illustrates the invention, Figures 1 and 2 represent one constructional example in front elevation and in a top plan view, respectively, while Figure 3 shows the top plan view of another constructional form.

The first example (Figures 1 and 2) concerns a half-shade polarizer of three calcite prisms $a$, $b$ and $c$. The medial prism $a$ is a triangular isosceles prism having the side surfaces $d$ and $e$. The hypotenuse surfaces of the two half-shade prisms $b$ and $c$, the top plan views of which represent rectangular triangles, are cemented to the said side surfaces $d$ and $e$ by means of linseed oil in such a manner that they touch each other in the edge $f$ at the point of the triangular isosceles prism $a$ and that one each of their side surfaces is parallel to the base of the prism $a$. The crystal axes of the three prisms $a$, $b$ and $c$, which are indicated in Figure 1 by arrows $a'$, $b'$ and $c'$, lie in the said figure in a plane parallel to that of the drawing and two each of them enclose the angle $$\frac{\alpha}{2},$$

the consequence being that the axis $a'$ bisects the half-shade angle $\alpha$ which is enclosed by the axes $b'$ and $c'$ and has an approximate size of 5°. The dash-line circle in Figure 1 indicates the size of the practically available field of vision.

When using the said half-shade polarizer the light enters the base of the prism $a$ in which it is divided into ordinary and extraordinary rays. The ordinary rays are totally reflected by the cemented surfaces $d$ and $e$, thus being rendered innocuous. The extraordinary rays however pass the cemented surfaces $d$ and $e$ and the mutual deviations of the directions of the crystal axes cause them to be divided into extraordinary and ordinary rays, which latter are rather weak owing to the small size of the angle of inclination $$\frac{\alpha}{2}.$$

Whereas the extraordinary rays maintain the direction they had before entering the cement layers $d$ and $e$, the ordinary rays are deviated so strongly that they are rendered harmless, the consequence being that only the extraordinary rays emanate from the side surfaces touching each other in the edge $f$.

The second constructional form (Figure 3) differs from the described form of the example in that instead of a triangular isosceles prism $a$ use is made of a prism $g$ of equal form which is made of fluorine crown glass of a refractive index $n_D=1.4881$. In this constructional form it is also shown that the surfaces of the half-shade polarizer which serve for the light entrance and exit can be protected by means of glass plates $h$ and $i$ cemented thereto.

The incident rays are refracted in the prism $g$ only once. In all other respects, provided the mutual positions of the crystal axes of the prisms $b$ and $c$ are identical with those according to Figure 1, the path of the rays is the same as in the first example. The glass plates $h$ and $i$ do not exert any influence worth mentioning on the path of the light rays.

I claim:

1. A half-shade polarizer consisting of elements cemented together so as to be integral with each other, at least two of said elements being calcite prisms the crystal axes of which lie in planes approximately at right angles to the direction of the light and enclose an angle of at least 1°, the so-called half-shade angle, the two surfaces effecting the polarizing decomposition of light being surfaces of an element inclined relatively to each other, this element being one single body touching on the said surfaces the said two calcite prisms whose crystal axes embrace the half-shade angle, all surfaces of the elements, with the exception of the exterior surfaces of the half-shade polarizer lying outside the field of vision of the observer, being light passing surfaces.

2. A half-shade polarizer consisting of a prism of the form of an isosceles triangle and of two calcite prisms cemented to the two side surfaces of the first said prism, the crystal axes of the two calcite prisms forming together approximately at right angles to the direction of the light an angle of at least 1°, the so-called half-shade angle.

3. In a half-shade polarizer according to claim 2 also the first said prism being of calcite.

4. In a half-shade polarizer according to claim 2, the first said prism being of glass.

ROBERT RICHTER.